United States Patent
Doan et al.

(10) Patent No.: US 10,061,473 B2
(45) Date of Patent: Aug. 28, 2018

(54) PROVIDING CONTEXTUAL ON-OBJECT CONTROL LAUNCHERS AND CONTROLS

(75) Inventors: Christopher Doan, Redmond, WA (US); Alexandre Gueniot, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 125 days.

(21) Appl. No.: 13/293,288

(22) Filed: Nov. 10, 2011

(65) Prior Publication Data
US 2013/0124989 A1    May 16, 2013

(51) Int. Cl.
*G06F 3/0482* (2013.01)
*G06F 8/38* (2018.01)

(52) U.S. Cl.
CPC .............. *G06F 3/0482* (2013.01); *G06F 8/38* (2013.01)

(58) Field of Classification Search
CPC .... G06F 17/24; G06F 17/245; G06F 3/04842; G06F 9/543
USPC ........................................................ 715/711
See application file for complete search history.

(56) References Cited

U.S. PATENT DOCUMENTS

| | | |
|---|---|---|
| 5,040,131 A | 8/1991 | Torres |
| 5,461,708 A | 10/1995 | Kahn |
| 5,495,565 A | 2/1996 | Millard et al. |
| 5,581,677 A | 12/1996 | Myers et al. |
| 5,844,572 A | 12/1998 | Schott |
| 5,894,311 A | 4/1999 | Jackson |
| 6,278,450 B1 * | 8/2001 | Arcuri et al. ................. 715/763 |
| 6,496,832 B2 | 12/2002 | Chi et al. |
| 6,570,587 B1 * | 5/2003 | Efrat ................. G06F 17/30017 |
| | | 707/E17.009 |
| 7,002,580 B1 | 2/2006 | Aggala et al. |
| 7,092,929 B1 | 8/2006 | Dvorak et al. |
| 7,107,519 B1 | 9/2006 | Webster et al. |
| 7,127,672 B1 | 10/2006 | Patterson et al. |
| 7,231,593 B1 | 6/2007 | Raja et al. |
| 7,292,244 B2 | 11/2007 | Vafiadis et al. |
| 7,444,599 B1 * | 10/2008 | Chaudhri .............. G06F 3/0485 |
| | | 715/815 |
| 7,565,608 B2 | 7/2009 | Faraday et al. |
| 7,627,812 B2 | 12/2009 | Chamberlain et al. |

(Continued)

FOREIGN PATENT DOCUMENTS

| | | |
|---|---|---|
| CN | 1755599 A | 4/2006 |
| CN | 1790325 A | 6/2006 |

(Continued)

OTHER PUBLICATIONS

"OLAP Statistics & Reporting," Retrieved: Sep. 2, 2011, 4 pgs., http://www.assistmyteam.net/OLAPStatistics/.

(Continued)

*Primary Examiner* — Sherrod Keaton

(57) ABSTRACT

Object editing controls may be provided. First, a selection of an object within an electronic document may be received. Then, in response to the received selection of the object, at least one selectable control may be displayed. The at least one selectable control may be configured to provide a set of most commonly used editing controls for editing the selected object. Upon selection of the at least one selectable control, a user interface comprising the set of most commonly used editing controls may be deployed next to the selected object.

20 Claims, 4 Drawing Sheets

(56) References Cited

U.S. PATENT DOCUMENTS

| | | | |
|---|---|---|---|
| 7,849,395 B2 | 12/2010 | Ellis et al. | |
| 7,853,877 B2* | 12/2010 | Giesen et al. | 715/711 |
| 7,882,427 B2 | 2/2011 | Raja et al. | |
| 7,908,567 B1* | 3/2011 | Bhojan | G06F 3/04855 715/711 |
| 7,949,953 B2 | 5/2011 | Bhatt et al. | |
| 8,136,106 B2 | 3/2012 | Low et al. | |
| 8,250,486 B2* | 8/2012 | Lentz | G06F 3/0482 715/711 |
| 8,255,789 B2 | 8/2012 | Berger et al. | |
| 8,549,392 B2 | 10/2013 | Simkhay et al. | |
| 8,612,380 B2* | 12/2013 | Kleppner et al. | 707/608 |
| 8,793,567 B2 | 7/2014 | Velingkar et al. | |
| 9,135,233 B2 | 9/2015 | Fan et al. | |
| 2003/0071814 A1 | 4/2003 | Jou et al. | |
| 2003/0110120 A1* | 6/2003 | Salehi | G06Q 30/02 705/37 |
| 2003/0154443 A1 | 8/2003 | Rapierniak et al. | |
| 2003/0195780 A1 | 10/2003 | Arora et al. | |
| 2004/0015783 A1 | 1/2004 | Lennon et al. | |
| 2004/0181543 A1 | 9/2004 | Wu | |
| 2004/0230471 A1 | 11/2004 | Putnam Brookes | |
| 2005/0010557 A1 | 1/2005 | Dellinger et al. | |
| 2005/0071325 A1 | 3/2005 | Bern | |
| 2005/0097465 A1 | 5/2005 | Giesen et al. | |
| 2005/0204304 A1 | 9/2005 | Garcia et al. | |
| 2005/0234960 A1 | 10/2005 | Chickering et al. | |
| 2006/0074866 A1 | 4/2006 | Chamerlain et al. | |
| 2006/0167911 A1 | 7/2006 | Le Cam | |
| 2006/0218483 A1 | 9/2006 | Weitzman et al. | |
| 2006/0285868 A1* | 12/2006 | Holmes | G06Q 10/00 399/81 |
| 2007/0024490 A1 | 2/2007 | Carter et al. | |
| 2007/0061369 A1 | 3/2007 | Folting et al. | |
| 2007/0061611 A1 | 3/2007 | Mackinlay et al. | |
| 2007/0074130 A1 | 3/2007 | Folting et al. | |
| 2007/0101299 A1* | 5/2007 | Shaw | G06F 3/0482 715/853 |
| 2007/0260970 A1 | 11/2007 | Dorwart | |
| 2008/0005677 A1 | 1/2008 | Thompson | |
| 2008/0082521 A1 | 4/2008 | Danielson et al. | |
| 2008/0127052 A1 | 5/2008 | Rostoker | |
| 2002/0222562 | 9/2008 | Helfman et al. | |
| 2008/0243784 A1 | 10/2008 | Stading | |
| 2008/0281783 A1 | 11/2008 | Papkoff et al. | |
| 2008/0288889 A1 | 11/2008 | Hunt et al. | |
| 2009/0044089 A1 | 2/2009 | Gur et al. | |
| 2009/0076974 A1 | 3/2009 | Berg et al. | |
| 2009/0096812 A1 | 4/2009 | Boixel et al. | |
| 2009/0257673 A1 | 10/2009 | Schweid | |
| 2009/0282324 A1 | 11/2009 | Patel | |
| 2009/0287673 A1 | 11/2009 | Chronister et al. | |
| 2009/0307207 A1 | 12/2009 | Murray | |
| 2009/0319897 A1* | 12/2009 | Kotler | G06F 3/04845 715/711 |
| 2010/0017872 A1 | 1/2010 | Goertz et al. | |
| 2010/0070448 A1 | 3/2010 | Omoigui | |
| 2010/0083086 A1 | 4/2010 | Berger et al. | |
| 2010/0107101 A1 | 4/2010 | Shaw et al. | |
| 2010/0205521 A1 | 8/2010 | Folting | |
| 2010/0214299 A1 | 8/2010 | Robertson et al. | |
| 2010/0228752 A1 | 9/2010 | Folting et al. | |
| 2010/0229122 A1* | 9/2010 | McCormack | G06F 3/0481 715/821 |
| 2011/0016425 A1* | 1/2011 | Homburg et al. | 715/811 |
| 2011/0055722 A1 | 3/2011 | Ludwig | |
| 2011/0066488 A1 | 3/2011 | Ludewig et al. | |
| 2011/0087954 A1 | 4/2011 | Dickerman et al. | |
| 2011/0252032 A1 | 10/2011 | Fitzgerald et al. | |
| 2011/0276867 A1 | 11/2011 | Machalek | |
| 2011/0295871 A1 | 12/2011 | Folting et al. | |
| 2012/0023101 A1 | 1/2012 | Heimendinger et al. | |
| 2012/0159297 A1 | 6/2012 | Peters | |
| 2012/0166927 A1 | 6/2012 | Shearer et al. | |
| 2012/0192053 A1 | 7/2012 | Waltenberger | |
| 2013/0080444 A1 | 3/2013 | Wakefield et al. | |
| 2013/0086459 A1 | 4/2013 | Folting et al. | |
| 2013/0086460 A1 | 4/2013 | Folting et al. | |
| 2013/0097177 A1 | 4/2013 | Fan et al. | |
| 2013/0124960 A1 | 5/2013 | Velingkar et al. | |
| 2013/0145244 A1 | 6/2013 | Rothschiller et al. | |
| 2016/0026695 A1 | 1/2016 | Fan et al. | |

FOREIGN PATENT DOCUMENTS

| | | |
|---|---|---|
| CN | 101253494 A | 8/2008 |
| CN | 101604243 | 12/2009 |
| CN | 101604243 A | 12/2009 |
| CN | 102027445 | 4/2011 |
| CN | 102027445 A | 4/2011 |
| EP | 863469 | 9/1998 |
| EP | 0863469 A2 | 9/1998 |
| EP | 1 286 284 A1 | 2/2003 |
| JP | H 05-165893 | 7/1993 |
| JP | 2004028864 A | 1/2004 |

OTHER PUBLICATIONS

U.S. Office Action dated Sep. 6, 2013 cited in U.S. Appl. No. 13/311,541, 20 pgs. (HB Law Firm).

U.S. Office Action dated Sep. 26, 2013 cited in U.S. Appl. No. 13/272,522, 27 pgs.

U.S. Office Action dated Nov. 4, 2013 cited in U.S. Appl. No. 13/298,285, 18 pgs. (HB Law Firm).

Brian Jones, "Document Assembly Solution for SpreadsheetML," Retrieved at <http://blogs.msdn.com/b/brian_jones/archive/2008/11/04/document-assembly-solution-for-spreadsheetmt.aspx>, Nov. 4, 2008, 11 pgs.

John Marinuzzi, "PowerPivot for Excel 2010," Retrieved at <https://community.altiusconsulting.com/blogs/altiustechblog/archive/2011/05/04/powerpivot-for-excel-2010.aspx>, May 4, 2011, 5 pgs.

Jean-Luc Doumont et al., "Choosing the Right Graph," Retrieved at <http://users.ece.gatech.edu/~gpalmer/ece8020/documents/PDF/Graphs.pdf>, IEEE Transactions on Professional Communication, vol. 45, No. 1, Mar. 2002, pp. 1-6.

U.S. Office Action dated Mar. 19, 2013 cited in U.S. Appl. No. 13/311,541, 13 pgs. ('541).

International Search Report dated Feb. 26, 2013 cited in Application No. PCT/US2012/066489, 9 pgs.

International Search Report dated Feb. 28, 2013 cited in Application No. PCT/US2012/057159, 13 pgs.

U.S. Office Action dated Oct. 22, 2012 cited in U.S. Appl. No. 13/245,126, 18 pgs.

U.S. Office Action dated Oct. 24, 2012 cited in U.S. Appl. No. 13/272,522, 23 pgs.

U.S. Final Office Action dated Apr. 15, 2013 cited in U.S. Appl. No. 13/272,522, 24 pgs.

Ani Gupta (nickname: Soan), "Excel Chart Advisor will Create and Suggest Charts for your Data," published on May 29, 2010, available at: http://am22tech.com/s/22/Blogs/post/2010/05/29/Excel-Chart-advisor-will-create-and-suggest-charts-for-your-data.aspx, 4 pgs.

"Chart Component .NET ver. 4.4," Printed: Jul. 27, 2011, available at http://www.chartcomponent.com/, 1pg.

Gary Klass. Presenting Data: Tabular and graphic display of social indicators. "Constructing Good Charts and Graphs" Printed Jul. 27, 2011, available at http://lilt.ilstu.edu/gmklass/pos138/datadisplay/sections/goodcharts.htm, 28pgs.

Jonathan I. Helfman et al., "Selecting the Best Graph Based on Data, Tasks, and User Roles." Jun. 11-15, 2007. http://www.upassoc.org/usability_resources/conference/2007/prp_049.pdf, 10 pgs.

Wikipedia. "Wikipedia talk:Collaboration to convert graphs to SVG " Printed: Jul. 27, 2011, http://en.wikipedia.org/wiki/Wikipedia_talk:Collaboration_to_convert_graphs_to_SVG#AAutomati_charts, 6pgs.

(56) References Cited

OTHER PUBLICATIONS

U.S. Final Office Action dated Mar. 12, 2014, cited in U.S. Appl. No. 13/272,522, 19 pgs.
U.S. Office Action dated Jun. 13, 2014, cited in U.S. Appl. No. 13/245,126, 35 pgs.
U.S. Office Action dated Jan. 16, 2015 cited in U.S. Appl. No. 13/311,541, 19 pgs.
U.S. Office Action dated Dec. 1, 2014 cited in U.S. Appl. No. 13/245,126, 15 pgs.
Chinese First Office Action dated Jan. 7, 2015 cited in Application No. 201210362781.X, 15 pgs.
Chinese First Office Action dated Jan. 26, 2015 cited in Application No. 201210448502.1 13 pgs.
U.S. Office Action dated Nov. 6, 2014 cited in U.S. Appl. No. 13/272,522, 25 pgs.
Chinese First Office Action with Search Report cited in Application No. 201210387253.X dated Jan. 19, 2015, 13 pgs.
Notice of Allowance dated Apr. 24, 2015 cited in U.S. Appl. No. 13/272,522, 11 pgs.
U.S. Office Action dated Jun. 25, 2015 cited in U.S. Appl. No. 13/245,126, 37 pgs.
Chinese Second Office Action Issued in Patent Application No. 201210387253.X, dated Jul. 8, 2015, 6 Pages.
U.S. Appl. No. 14/811,090 entitled "Suggesting Alternate Data Mappings for Charts" filed Jul. 28, 2015.
Mayes; "Office Labs Chart Advisor for Excel"; TVMCalcs.com; Aug. 25, 2008; Retrieved from the internet: http://www.tvmcalcs.com/index.php/blog/comments/office_labs_chart_advisor_for excel; 6 pgs.
Mysticgeek; "Create Charts in Excel 2007 the Easy Way with Chart Advisor"; How-to-Geek; Sep. 22, 2009; retrieved from the internet: http://howtogeek.com/howto/4136/create-charts-in-excel-2007-the-easy-way-with-chart-advisor; 10 pgs.
Chinese Office Action and Search Report Issued in Patent Application No. 201210514600.0, dated Sep. 30, 2014, 14 Pages.
Chinese Second Office Action Issued in Patent Application No. 201210514600.0, dated Jun. 10, 2015, 8 Pages.
Chinese Second Office Action Issued in Chinese Patent Application No. 201210448502.1, dated Sep. 30, 2015, 11 Pages.
EP Communication dated Dec. 2, 2015 in Appln No. PCT/US2012/057159, 10 pgs.
Notice of Allowance Issued in U.S Patent Application No. 13/272,522 dated May 22, 2015, 4 pgs.
Office Action dated Jul. 27, 2015 cited in U.S. Appl. No. 13/311,541, 21 pgs. (Not at M&G).
U.S.Office Action dated Dec. 1, 2015 cited in U.S. Appl. No. 14/811,090, 29 pgs.
U.S. Appl. No. 14/811,090, Office Action dated Aug. 25, 2016. 19 pages.
Japanese Office Action in Application 2014-533655, dated Jul. 1, 2016, 8 pages.
U.S. Appl. No. 14/811,090, Office Action dated Jun. 8, 2016, 24 pages.
U.S. Appl. No. 14/811,090, Office Action dated Jan. 13, 2017, 17 pages.
U.S. Appl. No. 14/811,090, Advisory Action dated Apr. 11, 2017, 3 pages.
U.S. Appl. No. 14/811,090, Office Action dated Sep. 22, 2017, 20 pages.
Chinese Final Office Action Issued in Chinese Patent Application No. 201210448502.1, dated Mar. 2, 2016, 9 Pages.
Chinese Notice of Allowance Issued in Patent Application No. 201210387253.X, dated Nov. 5, 2015, 4 Pages.
Chinese Third Office Action dated Dec. 18, 2015 in Appln No. 201210514600.0, 12 pgs.
EP Extended Search Report dated Aug. 6, 2015 in Appln No. PCT/US2012/066489, 10 pgs.
Chinese Notice of Allowance Issued in Patent Application No. 201210362781.X, dated Aug. 20, 2015, 4 Pages.
U.S. Final Office Action dated Jun. 11, 2013 cited in U.S. Appl. No. 13/245,126, 24 pgs.

* cited by examiner

PROVIDING CONTEXTUAL ON-OBJECT CONTROL LAUNCHERS AND CONTROLS

BACKGROUND

Electronic document editing software may allow users to create and edit objects within electronic documents. The objects may be, for example, pictures, tables, charts, or shapes. The electronic document editing software may provide users with tools for editing and manipulating various properties of these objects. However, these tools are often complex, unorganized, and hard to find within the software.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

On-object editing controls may be provided. First, a selection of an object within an electronic document may be received. Then, in response to the received selection of the object, at least one selectable control may be displayed. The at least one selectable control may be configured to provide a set of most commonly used editing controls for editing the selected object. Upon selection of the at least one selectable control, a user interface comprising the set of most commonly used editing controls may be deployed next to the selected object.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1A:
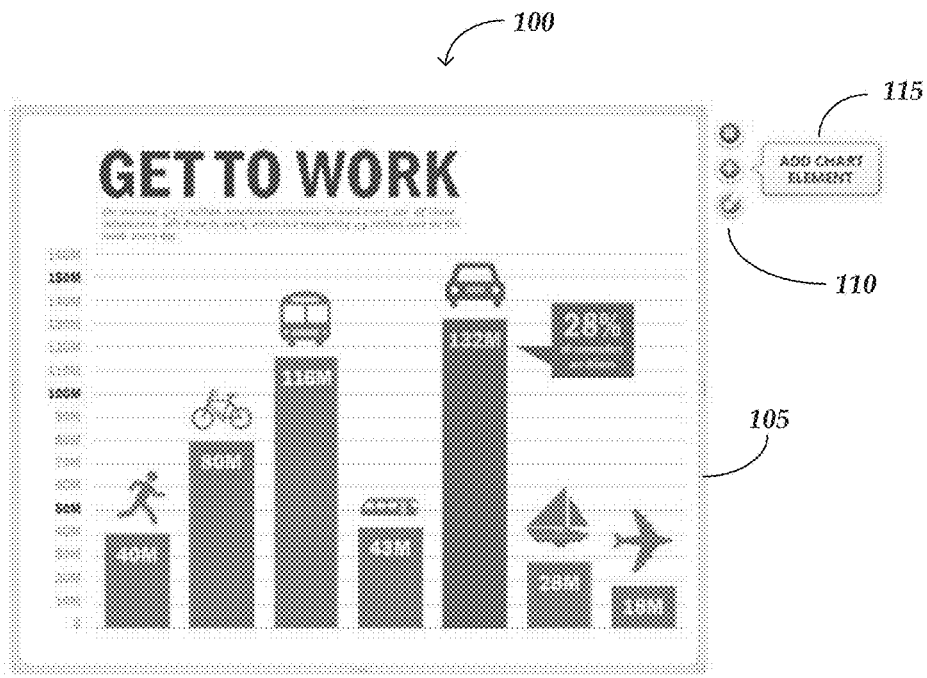
FIGS. 1A and 1B illustrate embodiments of on-object controls.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Conventional document creation software may provide users with tools for editing objects, such as charts, within an electronic document. The tools for editing the objects may vary for different object types and may be located in various portions, menus, and sub-menus of the software. As a result, these tools may be hard for a typical user to discover and efficiently use for editing.

FIG. 1A illustrates one embodiment of on-object controls 100 consistent with embodiments of the invention. To simplify object editing within document creation software, embodiments of the invention may provide the most commonly used object editing controls in a more user-friendly manner. As shown in FIG. 1A, on-object controls 100 may provide a user with selectable controls 110 displayed on or adjacent to an object 105, such as a chart. When selected, selectable controls 110 may be configured to deploy a user interface, such as a menu, listing, for example, the most commonly used object editing controls. In this way, a user may not need to navigate through complex user interface operations to find the most desirable editing controls.

Figure 1B:
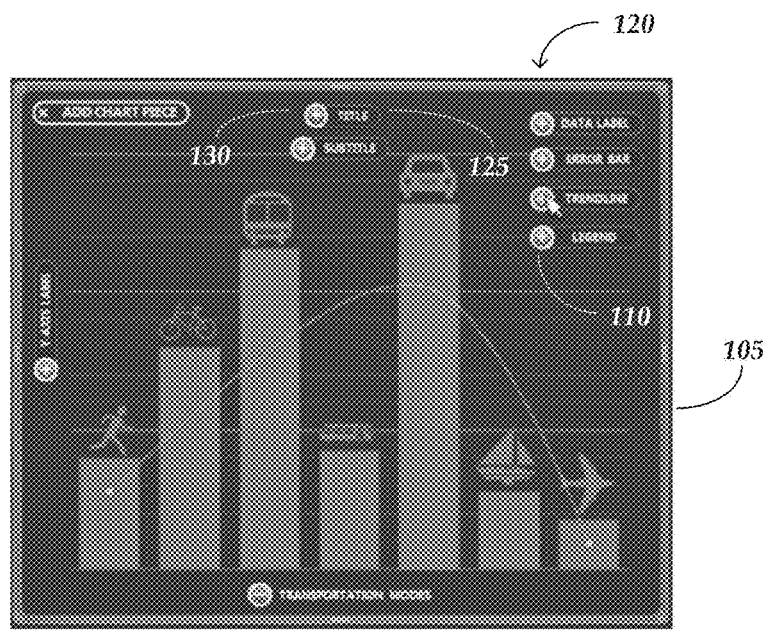

FIG. 1B illustrates another embodiment of on-object controls 120 consistent with embodiments of the invention. As mentioned above, selectable controls 110 may be displayed over portions of object 105. For example, a title portion 125 of object 105 may comprise a selectable control 130 that is operative to, upon selection, deploy a user interface for entering an object title. In this way, the user may be enabled to quickly enter the object title without processing through complex user interface operations.

Selectable controls 110 may comprise controls operative to, for example, provide the user with options to add chart elements, edit chart layout, and edit chart style. To assist the user in understanding the functionality of selectable controls 110, a tool-tip 115 may be displayed adjacent to each control upon a user focusing, for example, a pointing device over each control. Tool tip 115 may indicate to the user a functionality of the focused control. As will be discussed in further detail with reference to FIG. 2, upon selection of the focused control, the user may be provided a menu comprising the most commonly used controls in editing objects of a same type as object 105.

Figure 2:
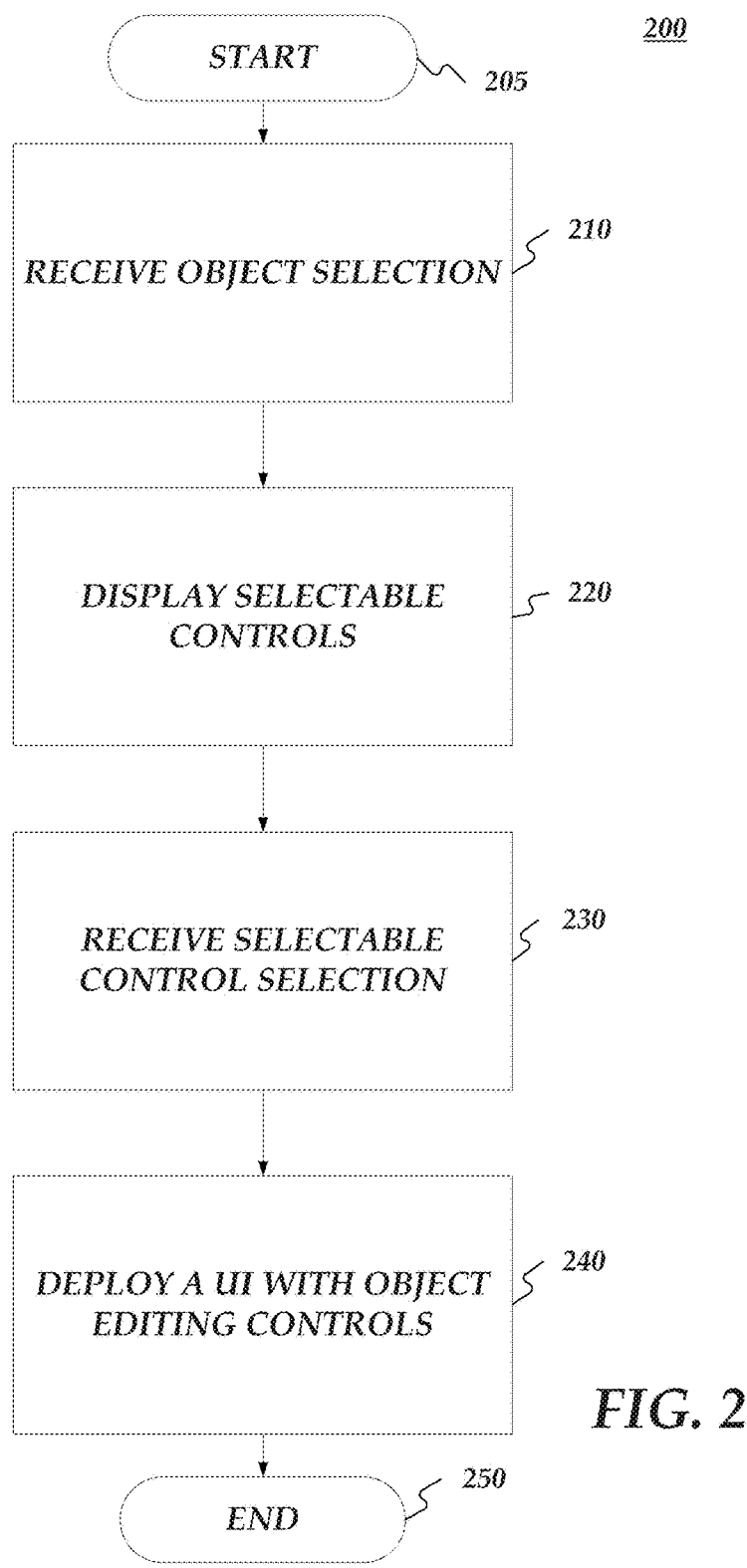
FIG. 2 is a flow chart of a method for providing object editing controls.

FIG. 2 is a flow chart setting forth the general stages involved in a method 200 consistent with an embodiment of the invention for providing object editing controls. Method 200 may be implemented using a computing device 400 as described in more detail below with respect to FIG. 4. Ways to implement the stages of method 200 will be described in greater detail below.

Method 200 may begin at starting block 205 and proceed to stage 210 where computing device 400 may receive a selection of object 105 within an electronic document. For example, the user may click on object 105 that may comprise, but not be limited to, for example, a chart, a graph, a text, a text box, a picture, and a shape.

From stage 210, where computing device 400 received the selection of object 105, method 200 may advance to stage 220 where computing device 400 may display selectable controls 110. Selectable controls 110 may be particular to editing selected object 105. Furthermore, to reduce user-interface clutter, various embodiments of the invention may hide selectable controls 110 from display when object 105 is not selected. Once the user selects object 105 for editing, selectable controls 110 may be displayed.

As shown in FIG. 1, selectable controls 110 may comprise, for example, three buttons. A first button may correspond to, for example, controls for editing a layout of underlying data corresponding to object 105 (e.g., chart layout). A second button may correspond to, for example, controls for editing elements displayed within object 105 (e.g., chart element addition/removal). A third button may correspond to, for example, controls for editing a style of object 105 (e.g., chart style). A location of display for selectable controls 110 may be, for example, fixed at an upper-right corner of object 105. When object 105 is moved, selectable controls 110 may move along with object 105.

Once computing device 400 displays selectable controls 110 in stage 320, method 200 may continue to stage 230 where computing device 400 may receive a selection of a selectable control from selectable controls 110. A state of the selected control may change to reflect a type of selection. For example, the default state of each selectable control may be an 'unselected' state. In this state, an icon reflecting each selectable control may have a first representation. Similarly, when selected, the icon reflecting the selected control may have a second representation within the 'selected state'.

In various embodiments, when a user's input device, such as a mouse or keyboard, hovers over or highlights one of the selectable controls, the focused control may transition to a 'rollover' state. In this state, the icon reflecting the focused control may glow, for example. In addition, when a selectable control is not applicable for editing selected object 105, the selectable control may be set to a 'disabled' state having a disabled representation. Alternatively, the selectable control may not be displayed at all when in the 'disabled' state.

Figure 3:
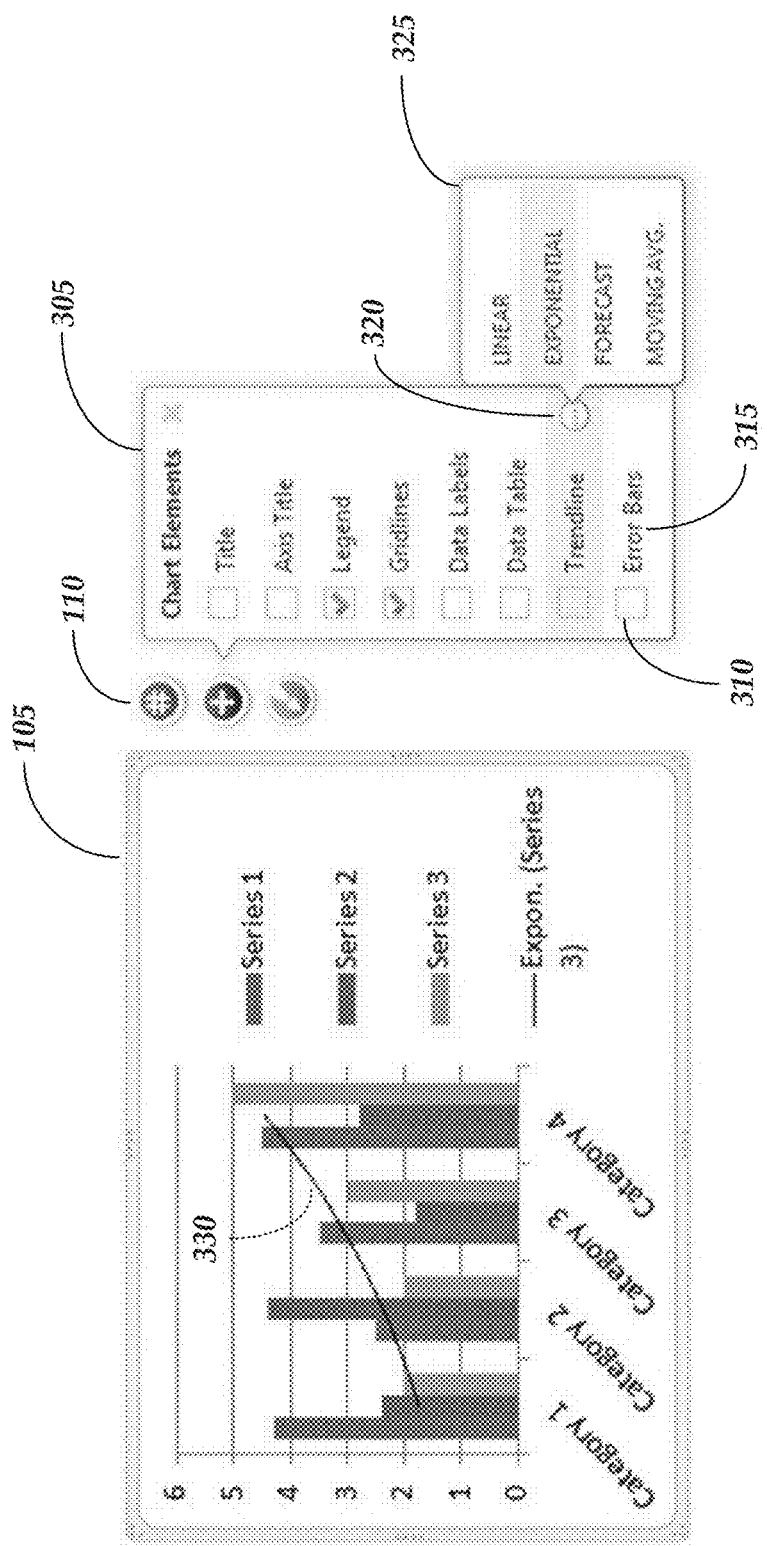
FIG. 3 illustrates on-object controls.

After computing device 400 receives a selection of the selectable control in stage 230, method 200 may proceed to stage 240 where computing device 400 may deploy a user interface comprising editing controls for object 105. The user interface may comprise, as illustrated in FIG. 3, for example, a fly-out menu 305 deployed in response to a selection of the selectable control. By default, fly-out menu 305 may comprise editing controls that are most commonly used with editing objects such as object 105. However, a user may configure fly-out menu 305 and manually select which editing controls would be displayed in fly-out menu 305.

In various embodiments, the editing controls within fly-out menu 305 may take the form of, for example, checkboxes 310. However, any form of selectable editing controls may be used. Each checkbox 310 may have a corresponding label 315. Label 315 may indicate an editing function or property that may be applied, or is currently applied, to object 105. For example, if a legend and gridlines are displayed within object 105, the corresponding checkboxes for the legend and gridlines would be checked.

Consistent with embodiments of the invention, a user may preview the editing function or property represented by the editing controls in menu 305. For example, when the user's input device hovers over or highlights an editing control within menu 305, object 105 may be dynamically modified to reflect the underlying function or property of the corresponding editing control. As shown in FIG. 3, trendline 330 may be displayed within object 105 when the trendline editing control is highlighted (e.g., though the checkbox remains unchecked). The dynamic modification may only be temporary. In this way, a user may preview the function or property of each editing control prior to application.

To apply the underlying function or property of the corresponding editing control, the user may select the checkbox representing the editing control. In addition, while the user's input device remains focused on the editing control, an options trigger 320 may appear. Options trigger 320 may indicate that additional options pertaining to the focused editing control are available. Not every editing control may have options trigger 320. Once the user selects options trigger 320, additional options may be provided in an additional fly-out menu 325. Fly-out menu 305 and additional fly-out menu 325 may be deployed adjacent to object 105. However, depending on the available space within the electronic document, the layout of fly-out menu 305 and additional fly-out menu 325 may be modified to best fit the electronic document.

Consistent with embodiments of the invention, editing controls within menu 305 may not only be preselected as the most commonly used controls for object editing, but the editing controls may also be preconfigured to have the most commonly used properties. For example, a chart may comprise gridlines that may be vertical, horizontal, or both. When a user selects the 'gridlines' editing control in menu 305, computing device 300 may run an algorithm to determine the most commonly used type of gridline for objects of a similar type as object 105. Computing device 300 may then apply the most commonly used type of gridline without the user having specified a type of gridline.

Should the user desire to manually select, for example, the type of gridline or any other control property, a user may be provided with an option (not show in FIG. 3) to enter a format object task pane (FOTP) to manually select the properties of the editing controls. Once computing device 400 deploys the user interface comprising the editing controls in stage 240, method 200 may then end at stage 250.

An embodiment consistent with the invention may comprise a system for providing object editing controls. The system may comprise a memory storage and a processing unit coupled to the memory storage. The processing unit may be operative to receive a first selection of an object and display at least one selectable control. In addition, the processing unit may be operative to receive a second selection of the at least one selectable control and to deploy a menu comprising commonly used editing controls for editing the object.

Another embodiment consistent with the invention may comprise a system for providing object editing controls. The system may comprise a memory storage and a processing unit coupled to the memory storage. The processing unit may be operative to receive a first selection of an object within an electronic document and overlay, in response to receiving the first selection, at least one selectable control on top of the object. The at least one selectable control may be configured to provide, upon selection, a set editing controls for the object. In addition, the processing unit may be operative to receive a second selection of the at least one selectable control and to deploy, in response to receiving the second selection, a plurality of checkboxes representing the set of editing controls in a menu displayed adjacently to the object.

Yet another embodiment consistent with the invention may comprise a system for providing object editing controls. The system may comprise a memory storage and a processing unit coupled to the memory storage. The processing unit may be operative to display a chart in an electronic document and to display a chart in an electronic document. Furthermore, the processing unit may be operative to receive a first selection of the chart and to display, in response to the first selection of the chart, at least one selectable control for editing the chart at one of the following positions: over a portion of the chart, and within a user-interface corresponding to the electronic document. Moreover, the processing unit may be operative to receive a second selection of the at least one selectable control and to determine a plurality of commonly used controls for editing the chart. In addition, the processing unit may be operative to display, in response to the second selection, the plurality of commonly used controls, receive indication of user-focus on one of the plurality of commonly used controls, and to preview a functionality of the user-focused control.

Figure 4:
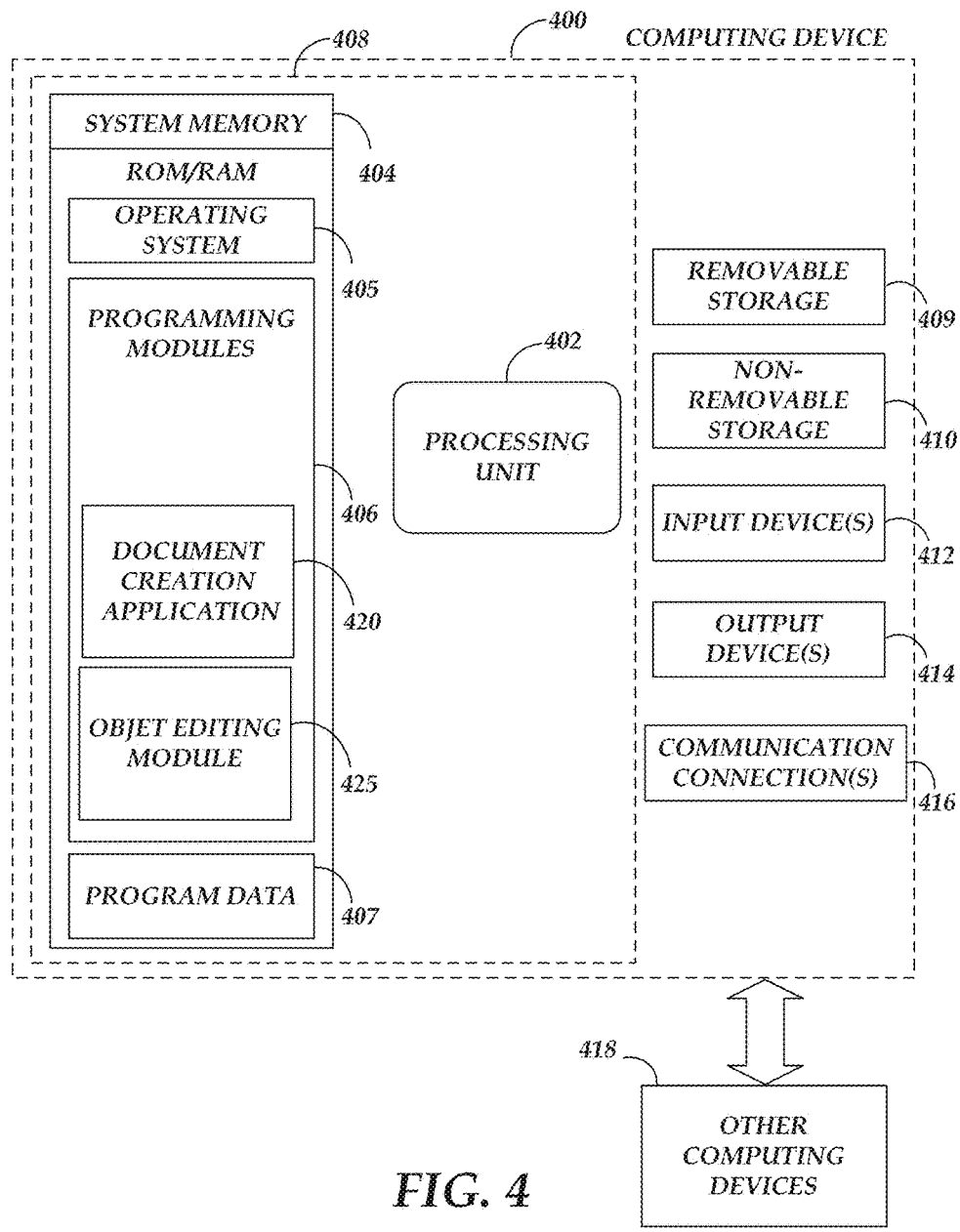
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a program data 407. Operating system 405, for example, may be suitable for controlling computing device 400's operation. In one embodiment, programming modules 406 may include document creation application 420 and object editing module 425. Document creation application 420 may be operative to perform, for example, word processing, spreadsheet processing, and/or presentation processing. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. document creation application 420 and object editing module 425) may perform processes including, for example, one or more method 200's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

In a distributed computing environment, program modules may be located in both local and remote memory storage devices. The program modules may be stored on any number of storage media that may be accessed by via a wired or wireless connection. Similarly, the modules may be readily accessed and transferred between computing devices.

Embodiments of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the invention, may be performed via application-specific logic integrated with other components of computing device 400 on the single integrated circuit (chip). Moreover, the components illustrated in FIG. 4 may be practiced, for example, in a mobile device or in a cloud computing system.

Computing device 400 may be coupled to a camera that may be operative to record a user and capture motions and/or gestures made by the user. Computing device 400 may be further operative to capture words spoken by the user, such as by a microphone, and/or capture other inputs from the user such as by a keyboard and/or mouse. Consistent with embodiments of the invention, the camera may comprise any motion detection device capable of detecting the movement of the user. For example, the camera may comprise a Microsoft® Kinect® motion capture device comprising a plurality of cameras and a plurality of microphones.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A computer-readable hardware device having a set of instructions which when executed performs a method for providing object editing controls, the method executed by the set of instructions comprising:
   receiving a first selection of an object within an electronic document;
   displaying, in response to receiving the first selection of the object, at least one selectable control attached to a fixed position relative to the object, the at least one selectable control being configured to provide, upon selection, a set of editing controls for the object;
   receiving a second selection of the at least one selectable control; and
   deploying, in response to receiving the second selection, the set of object editing controls for editing the property of the object in a user interface displayed adjacently to the selectable control attached to a fixed position relative to the object, wherein the set of object editing controls include a plurality of checkboxes representing editing controls that have their control parameters optimized for a type of the object;
   receiving an input to move the object from a first position within the electronic document to a second position within the electronic document;

continuing to display the at least one selectable control attached to the fixed position relative to the object while the object is moving to the second position within the electronic document;

receiving a third selection of at least one checkbox of the plurality of checkboxes, wherein receiving the third selection comprises receiving an indication of user-focus on the at least one checkbox, and wherein applying functionality of the corresponding editing control comprises generating a dynamic preview of the functionality onto the object; and applying a functionality of the editing control corresponding to the selected at least one checkbox.

2. The computer-readable hardware device of claim 1, wherein deploying, in response to receiving the second selection, the set of editing controls comprises:

determining the most commonly used editing controls; and displaying a checkbox for the most commonly used editing controls.

3. The computer-readable hardware device of claim 1, wherein overlaying, in response to receiving the first selection, at least one selectable control on top of the object comprises displaying at least one of the following:

a first selectable control configured to provide, upon selection, layout controls;

a second selectable control configured to provide, upon selection, element controls; and a third selectable control configured to provide, upon selection, style controls.

4. The computer-readable hardware device of claim 1, further comprising displaying, upon receiving an indication of user-focus on the at least one selectable control, a tool-tip for the at least one selectable control.

5. The computer-readable hardware device of claim 1, wherein deploying, in response to receiving the second selection, the plurality of checkboxes representing the set of editing controls comprising deploying the plurality of checkboxes having certain checkboxes preselected when the object reflects properties corresponding to those certain checkboxes.

6. The computer-readable hardware storage device of claim 1, further comprising:

receiving an indication of user-focus on at least one checkbox; and providing, in response to the indication of the user-focus, an additional selectable control configured to, upon selection, deploy additional controls operative to edit parameters of an editing control corresponding to the at least one checkbox.

7. A system for providing object editing controls, the system comprising:

a memory storage; and at least one processor coupled to the memory storage, the at least one processor configured to:

receive a preselection of a set of controls to be displayed pertaining to an object;

receive a first selection of a chart in an electronic document;

display within borders of the chart, in response to the first selection of the chart, at least one selectable control attached to a position relative to the chart, wherein the at least one selectable control is used for editing the property of the chart and the at least one option is from the preselected set of controls;

receive an input to move the chart from a first position within the electronic document to a second position within the electronic document;

continue to display the at least one selectable control within the borders of the chart within the electronic document, wherein the at least one selectable control remains attached to the position relative to the chart;

receive a second selection of the at least one selectable control;

determine a plurality of commonly used controls for editing objects of a same type as the chart;

display adjacent to the at least one selectable control, in response to the second selection, a plurality of commonly used editing controls for editing the chart;

receive an indication of user-focus on one of the plurality of commonly used controls; and provide, in response to receiving the indication of the user-focus on a control in the plurality of commonly used controls, a preview comprising a temporarily modified object reflecting an underlying functionality of the user-focused control.

8. The system of claim 7, wherein displaying the commonly used controls includes displaying a checkbox corresponding to each of the set of most commonly used controls, the checkbox having a corresponding label indicating an editing function that may be applied upon the selection of the checkbox.

9. The system of claim 7, wherein the processor is further configured to display one or more additional selectable controls as an overlay over a portion of the object.

10. The system of claim 7, wherein the processor is further configured to display, upon receiving an indication of user-focus on the at least one selectable control, a tool-tip for the at least one selectable control.

11. The system of claim 7, wherein the processor is further configured to display, in response to receiving the second selection, the set of controls pertaining to the object comprises deploying editing controls having their control parameters optimized to correspond to a chart type.

12. The system of claim 7, wherein the at least one selectable control include one or more of a control for editing the layout of the chart, a control for editing elements displayed within the chart, or a control for editing a style of the chart.

13. The system of claim 7, wherein the plurality of commonly used editing controls include one or more of a title editing control, an axis title editing control, a legend editing control, a gridlines editing control, a data labels editing control, a data table editing control, a trendline editing control, or an error bars editing control.

14. A method for providing object editing controls, the method comprising:

receiving a preselection of a set of controls to be displayed pertaining to an object;

receiving a first selection of a chart in an electronic document;

displaying outside of the borders of the chart, in response to the first selection of the chart, at least one selectable control attached to a position relative to the chart, wherein the at least one selectable control is used for editing the property of the chart and the at least one option is from the preselected set of controls receiving an input to move the chart from a first position within the electronic document to a second position within the electronic document;

continuing to display the at least one selectable control, wherein the at least one selectable control remains attached to the position relative to the chart;

receiving a second selection of the at least one selectable control;

determining a plurality of commonly used controls for editing objects of a same type as the chart;

displaying adjacent to the at least one selectable control, in response to the second selection, a plurality of commonly used editing controls for editing the chart;

receiving an indication of user-focus on one of the plurality of commonly used controls; and providing, in response to receiving the indication of the user-focus on the one of the plurality of commonly used controls, a preview comprising a temporarily modified object reflecting an underlying functionality of the user-focused control.

15. The method of claim 14, wherein the method further comprises displaying, in response to receiving the indication of user-focus on the one of the plurality of commonly used controls, an options trigger adjacent the one of the plurality of commonly used controls.

16. The method of claim 15, wherein the method further comprises:

receiving a selection of the options trigger; and in response to receiving the selection of the options trigger, displaying a fly-out menu containing additional options for editing the chart.

17. The method of claim 14, wherein the at least one selectable control include one or more of a control for editing the layout of the chart, a control for editing elements displayed within the chart, or a control for editing a style of the chart.

18. The method of claim 14, wherein the plurality of commonly used editing controls include one or more of a title editing control, an axis title editing control, a legend editing control, a gridlines editing control, a data labels editing control, a data table editing control, a trendline editing control, or an error bars editing control.

19. The method of claim 14, wherein the method further comprises:

receiving a third selection of at least one of the plurality of commonly used controls; and applying a functionality of the selected at least one editing control to the chart.

20. The method of claim 14, wherein displaying the commonly used controls includes displaying a checkbox corresponding to each of the set of most commonly used controls, the checkbox having a corresponding label indicating an editing function that may be applied upon the selection of the checkbox.

* * * * *